United States Patent [19]

Helms

[11] Patent Number: 5,490,039
[45] Date of Patent: Feb. 6, 1996

[54] INTEGRATED MOUSE TRAY AND MOUSE FOR PORTABLE COMPUTER HAVING CAVITY THEREFORE

[75] Inventor: Frank P. Helms, Round Rock, Tex.

[73] Assignee: Dell USA, L.P., Austin, Tex.

[21] Appl. No.: 158,097

[22] Filed: Nov. 24, 1993

[51] Int. Cl.⁶ ................................. G06F 1/16; H05K 7/14
[52] U.S. Cl. ............................................ 361/683; 361/727
[58] Field of Search ..................... 345/163–167, 345/169, 905; 364/708.1; 361/680–686, 727; 312/223.2

[56] References Cited

U.S. PATENT DOCUMENTS 5,126,955  6/1992  Tomada ................................... 361/680

FOREIGN PATENT DOCUMENTS 2-224005  9/1990  Japan ............................... G06F 1/16
5-53688   3/1993  Japan ............................... G06F 1/16

OTHER PUBLICATIONS

Advertisement for OmniBook 425 by Hewlett Packard, in PC WEEK, vol. 10, No. 45, pp. 60–61, Nov. 15, 1993.

*Primary Examiner*—Michael W. Phillips
*Attorney, Agent, or Firm*—David Hitt; James Huffman

[57] ABSTRACT

Disclosed are an integrated mouse tray and mouse for a portable computer and method of operation therefor. The computer, including the mouse tray of the present invention, includes: (1) a chassis having a footprint and containing components of the computer, the components including an interface circuit for communicating with a mouse, (2) a mouse electrically coupled to the interface circuit, the mouse free to move about a substantial plane to produce signals for transmission to the interface circuit and (3) a mouse tray member movably mounted to the chassis and capable of assuming a deployed position whereby the mouse tray extends substantially out of the chassis footprint, a substantially planar surface of the mouse tray providing an area on which the mouse is free to move to produce the signals, the mouse tray member further capable of assuming a stowed position whereby the mouse tray is retracted substantially to within the chassis footprint. The mouse tray member provides a portable, integrated working surface to allow a portable computer to use a mouse as a pointing device without requiring a separate working surface. The mouse tray member includes a lip having a height greater than the height of the mouse.

32 Claims, 3 Drawing Sheets

INTEGRATED MOUSE TRAY AND MOUSE FOR PORTABLE COMPUTER HAVING CAVITY THEREFORE

TECHNICAL FIELD OF THE INVENTION

The present invention is directed, in general to input devices for computers and, more specifically, to an integrated mouse tray for a portable computer that provides a portable working surface for a mouse, allowing the computer to use a mouse as a pointing device.

BACKGROUND OF THE INVENTION

Over the last several years, personal computers ("PC"s) have made increasing use of a pointing device, such as a mouse, a trackball, a touchpads or a stylus pointer to increase the useability of computer programs. In particular, computer programs employing graphical user interfaces such as Microsoft Windows make extensive use of a pointing device to access program functions.

Of the above, the mouse has over time proven to be the fastest and most efficient pointing device in the PC environment. Thus, it has become commonplace for desktop PCs to come equipped with a mouse. The mouse sits to the side of the desktop PC and typically resides on a flat surface. The mouse requires a substantially planar surface on which to move freely under the guidance of the user's hand to provide input to the computer. For purposes of the present discussion, "workspace" shall be defined as the surface or area on which a mouse is free to move.

Mice differ from other pointing devices in two respects. First, a mouse uniquely allows a user to employ both finger and wrist action to "click" and "drag." Second, a mouse can be lifted from the surface on which it moves to allow physical repositioning of the mouse without repositioning the pointer on the computer screen.

A rapidly growing segment of the PC market is portable computers, including laptop, notebook and palmtop computers. These portable computers often embody the equivalent computing power of desktop computers in a small, easily transportable unit. Laptop and notebook computers, in particular, are as powerful and are designed to operate the same software as their desktop counterparts, including software that requires or functions better with a pointing device.

Unfortunately, portable computers are frequently used in a user's lap or in other impromptu locations. For the portable computer to use a mouse, the preferred pointing device, these impromptu locations must provide a workspace for the mouse. This is often not the case. Accordingly, an alternative pointing device, such as a trackball, must be used to avoid restricting use of the portable computer to a desktop.

To date, most portable computers equipped with a pointing device have either a hand-held or chassis-mounted trackball. Most chassis-mounted trackballs are either integrated within the chassis itself or extend from the side of the chassis. The side-mounted trackballs must either be separated from the chassis when the computer is stored or remain on the side, subject to punishment from impact during transportation. In addition, side-mounted trackballs have a cord allowing the trackballs to provide signals to the computer. This cord dangles from the computer if the trackball remains mounted to the side during transportation, furthering the inconvenience and risk of damage thereto.

Other portable computers employ small "joystick" like pointing devices that provide most of the functionality of a mouse. However, these alternative pointing devices are relatively fragile and are not as useful or effective as mice.

Accordingly, what is needed in the art is a portable computer that provides a workspace for a mouse, allowing a portable computer to use a standard mouse as a pointing device, even when desktop space is not available for use by the mouse.

SUMMARY OF THE INVENTION

To address the above-discussed deficiencies of the prior art, it is a primary object of the present invention to provide a portable working surface that is integrated with a portable computer to allow the computer to use a mouse as a pointing device without requiring a separate working surface to be provided.

Accordingly, in the attainment of the primary object, the present invention provides an integrated mouse tray and mouse for a portable computer and method of operation therefor. The computer, including the mouse tray of the present invention, comprises: (1) a chassis having a footprint and containing components of the computer, the components including an interface circuit for receiving signals from a mouse, (2) a mouse electrically coupled to the interface circuit, the mouse free to move about a substantial plane to produce signals for transmission to the interface circuit and (3) a mouse tray member movably mounted to the chassis and capable of assuming a deployed position whereby the mouse tray extends substantially out of the chassis footprint, a substantially planar surface of the mouse tray providing a working surface on which the mouse is free to move to produce the signals, the mouse tray member further capable of assuming a stowed position whereby the mouse tray is retracted substantially to within the chassis footprint.

Thus, portable computers equipped with the present invention can make use of a mouse as a pointing device, rather than a less desirable trackball, touchpad or stylus pointer. The present invention essentially provides a traveling desktop upon which the mouse can be operated.

It is a further object of the present invention to provide a place to store the mouse while the portable computer is in transport. Accordingly, in a preferred embodiment of the present invention, a cavity is provided in the chassis for stowing the mouse. Thus, when the computer is stowed for transport, the mouse can fit conveniently within the computer itself, rather than requiring separate space for stowing the mouse. The mouse is deployed from a cavity in the chassis when the mouse tray assumes the deployed position. To accomplish deployment of the mouse, the mouse tray has a projection thereon for retaining the mouse in a cavity in the chassis when the mouse tray is in the stowed position. The mouse tray is preferably provided with a projection thereon for limiting a travel of the mouse tray. The travel limit projection prevents the mouse tray from being overextended and separated from the portable computer. Preferably, a detent is also provided to retain the mouse tray in deployed position.

The mouse may be of the mechanical variety, wherein a rolling element of the mouse rolls on the substantially planar surface to produce the signals. Alternatively, the present invention contemplates use of an optical mouse that produces signals as it traverses a grid of lines placed on the planar surface.

Most mice are coupled to computers by a length of cable. The present invention, in a preferred embodiment, provides a structure for deploying and stowing the cable. The structure is located in the chassis and may be activated as a function of mouse tray position.

The present invention contemplates a preferred embodiment wherein a pair of guides on the chassis are employed to allow the mouse tray to slide linearly with respect to the chassis to assume the deployed and stowed positions. However, it is within the scope of the present invention to provide for a rotatable relationship between the mouse tray and the chassis such that a rotation in a vertical or horizontal plane allows the mouse tray to be deployed or stowed.

Finally, the present invention is preferably employed in conjunction with a portable computer, most preferably of the notebook variety. Such portable computers conventionally comprise a display device rotatably mounted with respect to the chassis and a keyboard associated with the chassis. The display device rotates away from the chassis to expose the keyboard for use, the keyboard cooperating with the mouse to allow a user to communicate with the computer. However, the present invention is also employable in conjunction with a desktop computer, wherein the integrated mouse tray is useful to provide additional deskspace on which to place the mouse. Furthermore, the present invention can be used with palmtop computers or personal digital assistants ("PDA"s) to permit a mouse to act therewith as an input device.

The foregoing has outlined rather broadly the features and technical advantages of the present invention so that the detailed description of the invention that follows may be better understood.

Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
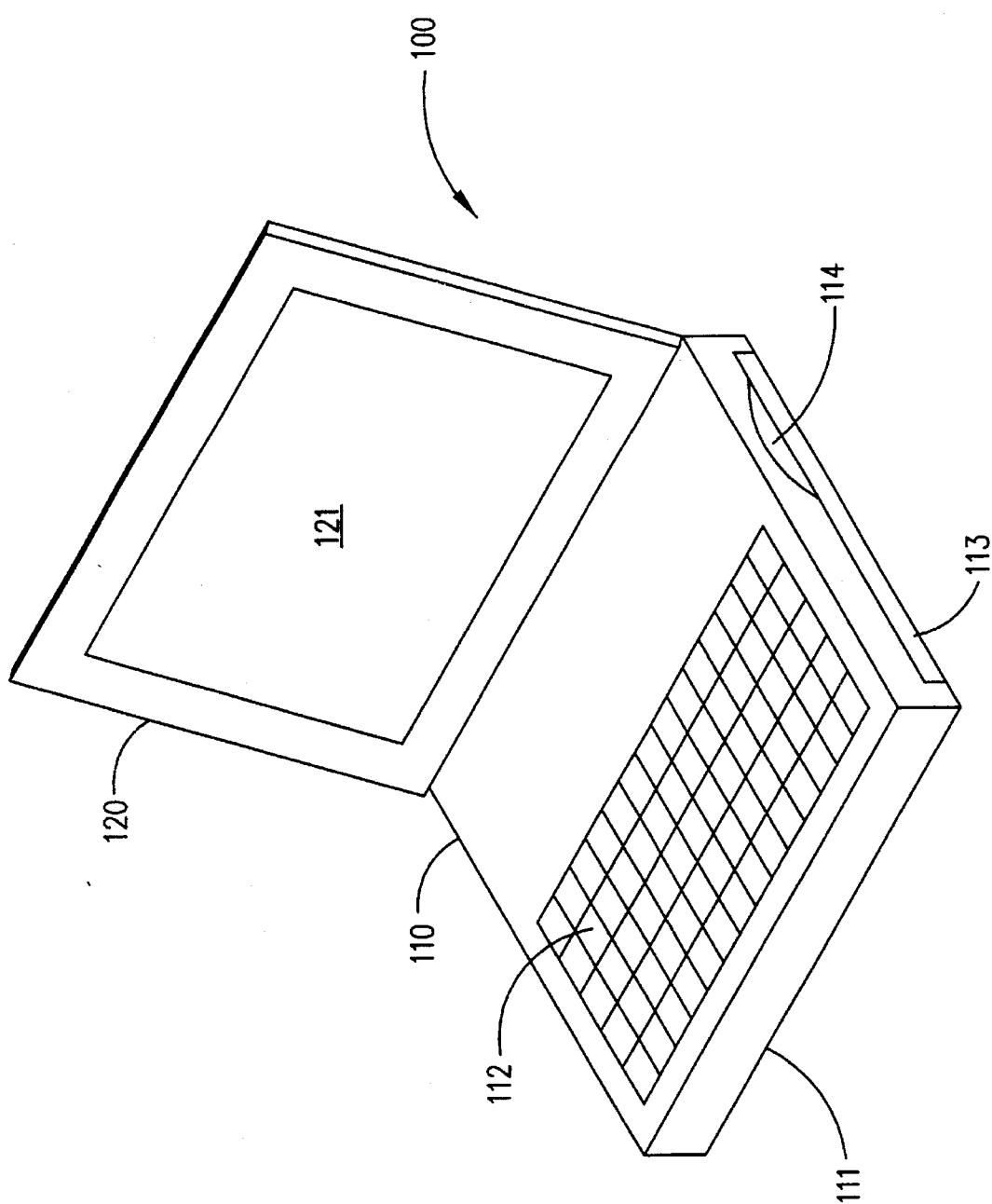
FIG. 1 illustrates an isometric view of a portable computer embodying the present invention with a mouse tray and mouse thereof in a retracted, stowed configuration.

FIG. 1 illustrates an isometric view of a portable computer, generally designated 100, embodying the present invention. The portable computer 100 comprises a lower half 110 and an upper half 120. The lower half 110 comprises an outer shell or chassis 111 that contains various, compactly-arranged electronic components of the portable computer 100 (including an interface circuit not shown in FIG. 1 for receiving signals from a mouse) and a keyboard 112 allowing a user to transmit information to the portable computer 100. The chassis 111 shields these components (not shown in FIG. 1 because they are internal to chassis 111, but detailed in pertinent part in FIG. 2) from damage by exposure to an environment external to the chassis 111. The upper half 120 contains a flat panel display device 121 allowing the portable computer 100 to transmit information to the user.

The lower half 110 and the upper half 120 are hinged together to allow the lower half 110 and the upper half 120 to rotate relative to each other. This allows the portable computer 100 to assume a closed storage position wherein the upper and lower halves 110, 120 shield the keyboard 112 and the flat panel display 121 from damage and wherein the portable computer 100 can be conveniently stored. The portable computer 100 can also assume (as shown) an open, operating position wherein the keyboard 112 and the display 121 are exposed to a user for communication therewith. The chassis 111 has a footprint defined as an area covered by the chassis when it is placed flat upon a surface. This area equals the length of the chassis multiplied by its height.

As discussed previously, it is highly desirable to provide the portable computer 100 with a pointing device, allowing one to point at a location on the display 121 by moving the pointing device. Since the most desirable pointing device is a conventional mouse, the portable computer 100 is equipped with an integrated mouse tray to provide flat rigid workspace for a mouse when the portable computer is not being used on a desktop. Accordingly, FIG. 1 shows a mouse tray 113 in a stowed position whereby the mouse tray 113 is retracted substantially to within the chassis footprint. A mouse 114 is stowed in a cavity on a side of the chassis 111. The mouse 114 is electrically coupled to the interface circuit in the chassis 111. The mouse 114 is free to move about a substantial plane to produce signals for transmission to the interface circuit when the mouse 114 is released from the cavity. The cavity is preferably designed for the mouse 114 so that the mouse 114 does not materially move within the cavity when the portable computer 100 is moved. A lip (not separately referenced in FIG. 1) of the mouse tray 113 retains the mouse 114 in its stowed position within the cavity.

Figure 2:
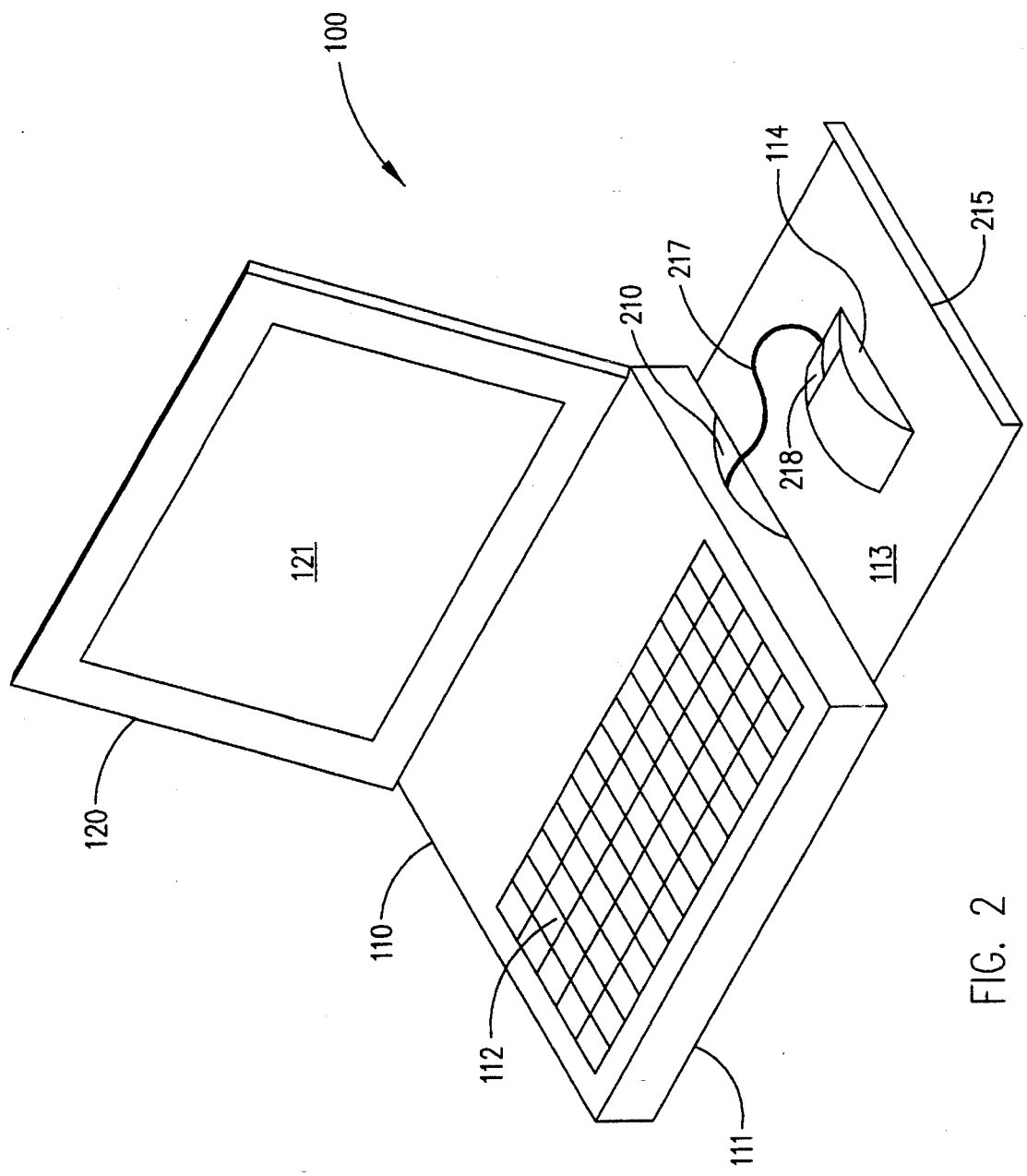
FIG. 2 illustrates an isometric view of the portable computer of FIG. 1 with the mouse tray and mouse thereof in a deployed, extended position.

Turning now to FIG. 2, illustrated is an isometric view of the portable computer 100 of FIG. 1 with the mouse tray 113 and mouse 114 thereof in a deployed, extended position. Since the mouse tray 113 is in its extended position, a substantially planar upper surface of the mouse tray 113 is exposed, the substantially planar surface providing an area on which the mouse 114 is free to move to produce the signals for transmission to the interface circuit.

As mentioned previously, the mouse tray 113 is equipped with an upward-turned lip 215 that serves to capture the mouse 114 to within its storage cavity 216. When the mouse tray 113 is deployed, the lip 215 prevents the mouse 114 from sliding sideways off of the mouse tray 113. Thus, to deploy the mouse tray 113 and the mouse 114, it is necessary to first extend the mouse tray 113, displacing the lip and freeing the mouse to exit its cavity. To stow the mouse tray 113 and the mouse 114, the order of operation is reversed. Thus, the mouse 114 is first stowed in its cavity; the mouse tray 113 is retracted to capture the mouse 114 in its cavity.

A cord 217 couples the mouse 114 to the interface circuit (shown in FIG. 3) to allow transmission of signals from the mouse 114 to the interface circuit. The cord 217 is of sufficient length to allow the mouse 114 to traverse the full length and width of the mouse tray 113 to take full advantage of the workspace the mouse tray 113 affords. The mouse 114 is provided with one or more buttons 218 arranged in a conventional manner to allow further input by the user.

In the embodiment shown in FIG. 2, the mouse 114 is of a mechanical type, wherein the mouse 114 is provided with a rolling ball that rolls about the planar surface of the mouse tray 113 as the mouse 114 is moved. Signals are sent to the interface circuit as a function of the ball's rotation in a conventional manner. Since the ball's rotation is important to the proper functioning of the mouse 114, the substantially planar surface of the mouse tray 113 is preferably designed to minimize sliding on the part of the ball. Thus, the present invention affords the further advantage of providing a surface optimized for use with a mechanical mouse.

Those skilled in the art will recognize alternatives to the arrangement shown in FIG. 2. For instance, the mouse 114 can be of the optical type, wherein photosensors within the mouse 114 scan the substantially planar surface of the mouse tray 113, detecting the passage of orthogonally-arranged lines on the surface as the mouse 114 is moved. Furthermore, the mouse 114 can transmit its signals to the interface circuit within the portable computer 100 via an infrared link, negating a need for the cord 217 and its associated storage structure (to be shown in connection with FIG. 3).

Figure 3:
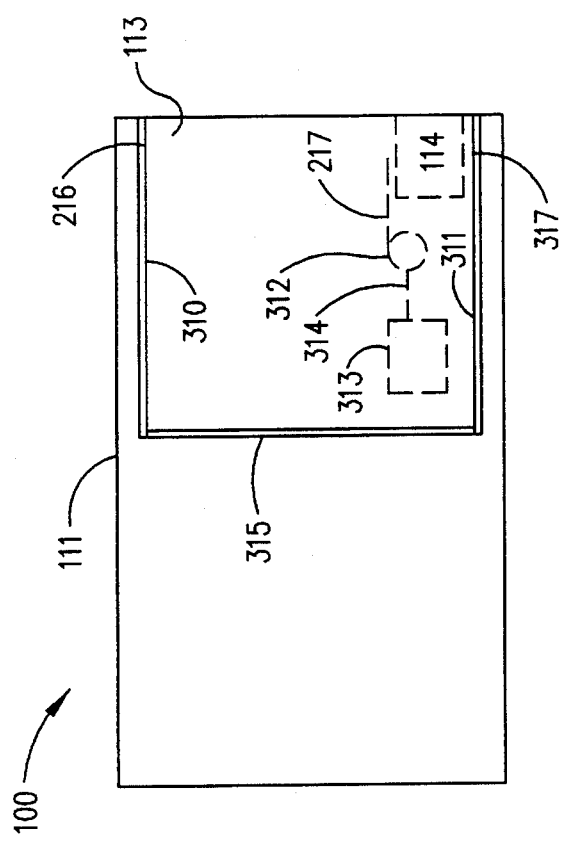
FIG. 3 illustrates a bottom view of the portable computer of FIG. 2 showing, in particular, one structure for movably attaching the mouse tray to the computer.

Turning now to FIG. 3, illustrated is a bottom view of the portable computer 100 of FIG. 2 showing, in particular, one structure for movably attaching the mouse tray 113 to the portable computer 100. The mouse tray 113 of the present invention is preferably slidably attached to the chassis 111 to allow the mouse tray 113 to slide sideways as shown in FIG. 3. This is accomplished by receiving and capturing the mouse tray in an opposing pair of guides 310, 311 on the chassis 111 rendering the mouse tray 113 capable of sliding linearly with respect to the chassis 111 along the guides 310, 311 to assume the alternative deployed and stowed positions. A projection 315 on the mouse tray 113 prevents the mouse tray from being overextended from the chassis. The projection 315 therefore acts as a stop. Detents 316, 317 act to retain the mouse tray 113 in its deployed position until a force of sufficient strength is used to urge the mouse tray 113 toward its stowed position.

A cord reel 312 is provided as a means to stow the cord 217 within the chassis. The cord 217 is shown as extending from the mouse 114 to the cord reel 312 and, via a short conductor 314, to the interface circuit 313, represented in a block diagram due to its conventional construction. The cord reel 312 is preferably spring-loaded so as to retract the cord 217 as desired. The cord reel 312 may be provided with a conventional stop mechanism to relieve spring tension temporarily so the cord 217 is not continuously being urged into the reel 312. As is conventional in such structures, the stop mechanism can be made releasable, such that a pull on the cord 217 releases the stop. As a further enhancement, the stop mechanism can be linked to mouse tray 113 position, allowing the stop mechanism to be disabled when the mouse tray 113 is retracted, causing automatic stowing of the cord 217.

Figure 4:
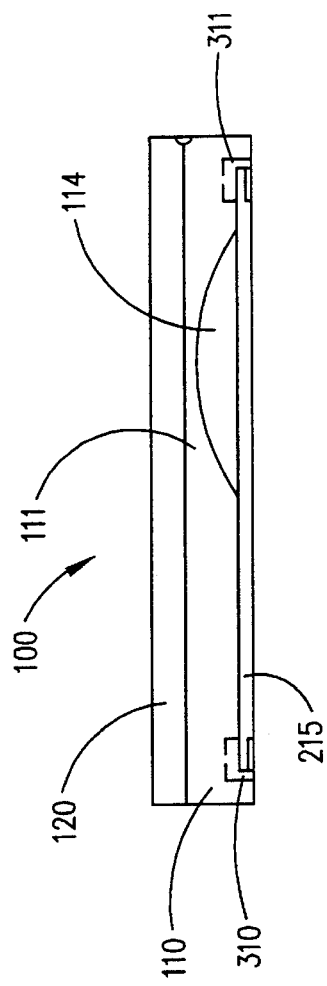
FIG. 4 illustrates a side elevational view of the portable computer of FIG. 3, showing, in particular, guides for a slidable mouse tray.

Turning now to FIG. 4, illustrated is a side elevational view of the portable computer of FIG. 3, showing, in particular, the guides 310, 311 for the slidable mouse tray 113. The guides 310, 311 wrap around the edges of the mouse tray 113 to capture the mouse tray 113 therebetween. FIG. 4 also shows the mouse tray lip 215 extending upward to capture the mouse 144 within its cavity when the mouse tray 113 is retracted into its stowed position.

Those skilled in the art will realize that the mouse tray 113 need not slide with respect to the chassis 111 to extend or retract. In fact, a single vertical pivot can allow the mouse tray 113 to rotate about a vertical axis to extend or retract. Alternatively, a hinge can establish a horizontal axis of rotation, allowing the mouse tray 113 to unfold from the chassis 111.

It is further contemplated that the mouse tray 113 can extend forward, toward the user, instead of to a side of the portable computer 100, as described in FIGS. 1 through 4. This forward extension would place the workspace for mouse travel in front of the keyboard, perhaps advantageous in some circumstances. Finally, the present invention contemplates that the mouse tray 113 can be extended to allow the mouse 114 to be drawn from its cavity and retracted, allowing the mouse to use a desktop or other substantially planar surface in lieu of that provided by the mouse tray 113, again, perhaps desirable in some instances.

From the above description, it is apparent that the present invention provides an integrated mouse tray and mouse for a portable computer and method of operation therefor. The portable computer, including the mouse tray and mouse, comprises: (1) a chassis having a footprint and containing components of the portable computer, the components including an interface circuit for receiving signals from a mouse, (2) a mouse electrically coupled to the interface circuit, the mouse free to move about a substantial plane to produce signals for transmission to the interface circuit and (3) a mouse tray member movably mounted to the chassis and capable of assuming a deployed position whereby the mouse tray extends substantially out of the chassis footprint, a substantially planar surface of the mouse tray providing an area on which the mouse is free to move to generate positional coordinates, the mouse tray member further capable of assuming a stowed position whereby the mouse tray is retracted substantially to within the chassis footprint.

Although the present invention and its advantages have been described in detail, it should be understood that various changes, substitutions and alterations can be made herein without departing from the spirit and scope of the invention as defined by the appended claims.

What is claimed is:

1. A computer, comprising:

a chassis having a footprint and containing components of said computer, said components including an input circuit for receiving signals from a mouse;

a mouse electrically coupled to said input circuit, said mouse having a first height and free to move along a substantial plane to produce signals for transmission to said input circuit; and a mousepad member movably mounted to said chassis and capable of assuming a deployed position whereby said mousepad extends substantially out of said chassis footprint, a substantially planar surface of said mousepad providing an area on which said mouse is free to move to produce said signals, said mousepad member further capable of assuming a stowed position whereby said mousepad is retracted substantially to within said chassis footprint, said mousepad having a projection of a second height thereon for retaining said mouse in a cavity in said chassis when said mousepad is in said stowed position, said second height shorter than said first height.

2. The computer as recited in claim 1 wherein said mouse is deployed from said cavity in said chassis when said mouse tray assumes said deployed position.

3. The computer as recited in claim 1 wherein said mouse tray has a projection thereon for limiting a travel of said mouse tray.

4. The computer as recited in claim 1 further comprising means for stowing an electrical conductor within said chassis, said conductor coupling said mouse to said interface circuit.

5. The computer as recited in claim 1 wherein a rolling element of said mouse rolls on said substantially planar surface to produce said signals.

6. The computer as recited in claim 1 wherein said mouse tray slides linearly with respect to said chassis to assume said deployed and stowed positions.

7. The computer as recited in claim 1 wherein said computer is a portable computer.

8. The computer as recited in claim 1 further comprising a display device rotatably mounted with respect to said chassis and a keyboard associated with said chassis, said display device and said keyboard cooperating with said mouse to allow a user to communicate with said computer.

9. A method of deploying and stowing of: a computer input device, comprising the steps extending a mousepad movably mounted to a chassis of said computer from a stowed position to a deployed position whereby said mousepad extends substantially out of said chassis footprint, said chassis containing components of said computer, said components including an input circuit for receiving signals from a mouse;

placing a mouse coupled to said input circuit on a substantially planar surface of said mousepad, said mouse having a first height and free to move along said substantially planar surface on said mousepad to produce signals for transmission to said input circuit; and retracting said mousepad into said stowed position whereby said mousepad is located substantially within said chassis footprint, said mousepad having a protection of a second height thereon for retaining said mouse in a cavity in said chassis when said mousepad is in said stowed position, said second height shorter than said first height.

10. The method as recited in claim 9 further comprising the step of deploying said mouse from said cavity in said chassis as said mouse tray assumes said deployed position.

11. The method as recited in claim 9 further comprising the step of limiting a travel of said mouse tray with a projection on said mouse tray.

12. The method as recited in claim 9 further comprising the step of stowing an electrical conductor within said chassis, said conductor coupling said mouse to said interface circuit.

13. The method as recited in claim 9 the step of rolling a rolling element of said mouse on said substantially planar surface to produce said signals.

14. The method as recited in claim 9 wherein the steps of extending and retracting said mouse tray each comprise the step of sliding said mouse tray linearly with respect to said chassis.

15. The method as recited in claim 9 wherein said computer is a portable computer.

16. The method as recited in claim 9 further comprising the step of rotating a display device hingedly mounted with respect to said chassis, said step of rotating exposing a keyboard associated with said chassis, said display device and said keyboard cooperating with said mouse to allow a user to communicate with said computer.

17. A portable computer, comprising:

a chassis having a footprint and containing components of said computer, said components including an input circuit for receiving signals from a mouse;

a mouse electrically coupled to said input circuit and removable from a cavity in said chassis, said mouse having a first height and free to move along a substantial plane to produce signals for transmission to said input circuit;

a display screen hingedly mounted to said chassis;

a keyboard mounted to a surface of said chassis, said display screen covering said keyboard when said display screen is in a closed position; and a mousepad member slidably mounted to said chassis and capable of assuming a deployed position whereby said mousepad extends substantially out of said chassis footprint, a substantially planar surface of said mousepad providing an area on which said mouse is free to move to produce said signals, said mousepad member further capable of assuming a stowed position whereby said mousepad is retracted substantially to within said chassis footprint, said mousepad member having a lip of a second height thereon for retaining said mouse in said cavity when said mousepad member is in said stowed position mouse, said second height shorter than said first height.

18. The computer as recited in claim 17 wherein said mouse is deployed from said cavity in said chassis when said mouse tray assumes said deployed position.

19. The computer as recited in claim 17 wherein said mouse tray has a projection thereon for limiting a travel of said mouse tray.

20. The computer as recited in claim 17 further comprising means for stowing an electrical conductor within said chassis, said conductor coupling said mouse to said interface circuit.

21. The computer as recited in claim 17 wherein a rolling element of said mouse rolls on said substantially planar surface to produce said signals.

22. The computer as recited in claim 17 wherein said mouse tray is received into a pair of guides on said chassis and is capable of sliding linearly with respect to said chassis about said guides to assume said deployed and stowed positions.

23. The computer as recited in claim 17 wherein said computer is a notebook computer.

24. The computer as recited in claim 17 wherein a detent retains said mouse tray in said deployed position.

25. A method of deploying and stowing a computer input device, comprising the steps of:

opening a display screen hingedly mounted to said chassis, said display screen exposing a keyboard mounted to a surface of said chassis when said display screen is in a closed position;

extending a mousepad slidably mounted to a chassis of said computer from a stowed position to a deployed position whereby said mousepad extends substantially out of said chassis footprint, said chassis containing components of said computer, said components including an input circuit for receiving signals from a mouse;

removing a mouse from a cavity in said chassis, said mouse coupled to said input circuit;

placing said mouse on a substantially planar surface of said mousepad, said mouse having a first height and free to move along said substantially planar surface on said mousepad to produce signals for transmission to said input circuit;

retracting said mousepad into said stowed position whereby said mousepad is located substantially within said chassis footprint, said mousepad member having a lip of a second height thereon for retaining said mouse in said cavity when said mousepad member is in said stowed position, said second height shorter than said first height; and closing said display screen.

26. The method as recited in claim 25 further comprising the step of deploying said mouse from said cavity in said chassis as said mouse tray assumes said deployed position.

27. The method as recited in claim 25 further comprising the step of limiting a travel of said mouse tray with a projection on said mouse tray.

28. The method as recited in claim 25 further comprising the step of stowing an electrical conductor within said chassis, said conductor coupling said mouse to said interface circuit.

29. The method as recited in claim 25 the step of rolling a rolling element of said mouse on said substantially planar surface to produce said signals.

30. The method as recited in claim 25 wherein the steps of extending and retracting said mouse tray each comprise the steps of sliding said mouse tray linearly with respect to said chassis, said mouse tray received into a pair of guides on said chassis and slidable about said guides.

31. The method as recited in claim 25 wherein said computer is a portable computer.

32. The method as recited in claim 25 further comprising the step of retaining said mouse tray in said deployed position with a detent.

\* \* \* \* \*